United States Patent [19]
Focqueur et al.

[11] Patent Number: 5,147,246
[45] Date of Patent: Sep. 15, 1992

[54] DEVICE WITH TORSION DAMPING BY RESILIENT PLATES, ESPECIALLY FOR AN AUTOMOTIVE VEHICLE

[75] Inventors: Hervé Focqueur, Franconville; Bernard Jumel, Pierrefitte; Jacques Paquin, Villeneuve La Garenne; Jacky Naudin, Ermont, all of France

[73] Assignee: Valeo, Paris, France

[21] Appl. No.: 715,719

[22] Filed: Jun. 18, 1991

Related U.S. Application Data

[63] Continuation of Ser. No. 347,211, May 4, 1989, abandoned.

[30] Foreign Application Priority Data

May 6, 1988 [FR] France .................... 88 06102
Mar. 17, 1989 [FR] France .................... 89 03545

[51] Int. Cl.⁵ .......................... F16D 3/12; F16D 3/52
[52] U.S. Cl. ........................... 464/59; 464/60; 192/106.1
[58] Field of Search .................. 464/59, 60, 99; 192/106.1

[56] References Cited

U.S. PATENT DOCUMENTS

| | | | |
|---|---|---|---|
| 1,197,021 | 4/1935 | Spase | 192/106.1 X |
| 2,141,014 | 12/1938 | Nutt | 192/106.1 |
| 3,387,505 | 6/1968 | Rumsey . | |
| 3,677,031 | 7/1972 | Zierak et al. | 464/99 |
| 4,044,628 | 8/1977 | Jacks | 464/59 X |
| 4,181,208 | 1/1980 | Davis | 464/59 X |
| 4,480,736 | 11/1984 | Loizeau | 192/106.1 |
| 4,496,036 | 1/1985 | Loizeau | 464/68 X |
| 4,795,012 | 1/1989 | Durum | 192/106.1 X |

FOREIGN PATENT DOCUMENTS

0200634 11/1986 European Pat. Off. .
2270491 12/1975 France .
2611013 8/1988 France .................... 192/106.1

Primary Examiner—Daniel P. Stodola
Assistant Examiner—Tony A. Gayoso
Attorney, Agent, or Firm—Longacre & White

[57] ABSTRACT

A torsion damper comprising juxtaposed resilient plates which operate in parallel and are interposed between a support member and a hub. Each resilient plate comprises at least one resiliently deformable arm. The torsion damper has at least two pairs of similar resilient plates. One of the pairs lies between the plates of the other pair and is offset with respect to the other pair by an angle such that the two pairs of plates are radially balanced. The resilient arms of any one pair are aligned with each other.

8 Claims, 4 Drawing Sheets

DEVICE WITH TORSION DAMPING BY RESILIENT PLATES, ESPECIALLY FOR AN AUTOMOTIVE VEHICLE

This application is a continuation of application Ser. No. 07/347,211, filed May 4, 1989, now abandoned.

FIELD OF THE INVENTION

This invention relates to a device with torsion damping, and in particular a friction clutch for an automotive vehicle, of the kind comprising at least two coaxial parts, one of which includes a support member and the other of which includes a hub, mounted for relative rotation with respect to each other within the limits of a predetermined angular displacement and against the action of juxtaposed resilient means operating in parallel, with each said resilient means being formed in a resilient plate and comprising at least one resiliently deformable arm and two carrier elements, with the said arm extending between the carrier elements and being connected through a junction or base zone integrally with at least one of the carrier elements, one of the latter being arranged to be coupled with one of the said coaxial rotatable parts of the device for rotation therewith, while the other carrier element is adapted to be coupled to the other of said parts of the device for rotation therewith. Such a device will be referred to as a device of the kind specified.

BACKGROUND OF THE INVENTION

A device of the kind specified is described in U.S. Pat. No. 4,493,036 (and in the corresponding French Patent Publication FR 2 493 446 A). In those documents it has been proposed that the resilient plates should be juxtaposed with each other and arranged "head to toe", i.e. displaced from each other through an angle of 180°, so as to avoid any displacement of the centre of the assembly during operation.

Even so, such an arrangement is not entirely satisfactory. This arises from the fact that, although the resultant forces brought into play are radially opposed to each other as between one resilient plate and the other, there is a damaging tilting moment, in axial planes, due to the axial displacement between one resilient plate and the next. For example, when the resilient plates are coupled with a sliding hub for rotation therewith, there is a risk of the hub becoming jammed. This is due to the fact that one of the resilient plates exerts a radial force on one axial end of the hub in an upper part of the latter, while the other resilient plate exerts a radial force in the opposite direction on the lower part of the hub at its other axial end.

The same is true when the hub, as part of one of the two coaxial parts of the clutch, is mounted on the bearing interposed between the hub and a support member constituting part of the other coaxial part of the clutch, the tilting moment then setting up stresses which are detrimental, particularly to the life expectancy of the bearing.

SUMMARY OF THE INVENTION

An object of the invention is to mitigate this disadvantage, by minimising the tilting moment within the torsion damping mechanism of the device, besides obtaining other advantages.

According to the invention, a device of the kind specified has at least two pairs of similar resilient plates, one of the pairs being arranged between the plates of the other pair and being offset circumferentially with respect to the other pair, in such a way that the said pairs are radially balanced, the resilient arms in any one pair of the resilient plates being aligned with each other.

The invention enables the two pairs to be balanced with respect to each other. With two pairs of plates, the angular offset is 180°, while with three pairs it is 120° and with four pairs it is either 90° or 180°.

As a result of these arrangements, the hub and its associated shaft undergo flexing movement over only a short distance, and the radial forces within the damper are negligible. In addition, the ability of the hub to slide on its shaft is not imperilled; and, when a bearing is interposed between the hub and another member of the coaxial rotating part of the clutch which does not include the hub, such a bearing is preserved from undue wear. It will be appreciated that the life expectancy of the torsionally damped device is improved, while its balancing is facilitated and the need for a conventional damper plate is eliminated. Due to the balance obtained by the use of the invention, the junction zone of the arm can be so dimensioned as to withstand large stresses, and the arm can extend through more than 360°. With such an arrangement it becomes possible, using thinner resilient plates, and with only one resilient arm for each plate, to achieve a large relative angular displacement between the hub and the support member, while yet being able to transmit a large torque. The device remains well balanced even at the limit of this angular displacement.

Those resilient plates which are generally similar to each other may have their resilient arms identical as between one pair of plates and the other, while being different in regard to their carrier elements. Preferably, however, in the case where there are two or three pairs of plates, all of the latter are identical with each other.

In one embodiment of the invention, the resilient arm is disposed between two carrier rings, namely an inner carrier ring and an outer carrier ring, the latter having at least one radial tab for coupling it with a support member for rotation therewith. This enables the rotational coupling between the support member and the resilient plates to be achieved, using spacing fasteners passing through holes formed in the tabs and in the support member.

Certain preferred embodiments of the invention will now be described, by way of example only, in order to illustrate the invention with reference to the accompanying drawings.

DESCRIPTION OF PREFERRED EMBODIMENTS OF THE INVENTION

The torsion damper shown in the drawings in three forms is for an automotive vehicle, particularly an automobile. In all these embodiments it comprises two axial parts, namely a driving or exciting part A and a driven or excited part B, mounted rotatably with respect to each other within the limits of a predetermined angular displacement and against the action of resilient means adapted to act between them in a generally circumferential direction.

The device, incorporating a torsion damper, which is shown in FIGS. 1 to 5, comprises a friction clutch for an automobile. Its driven part B includes a hub 10 which is adapted to be engaged on the input shaft of the vehicle's gearbox, which has a splined portion cooperating with complementary splines 12 formed in the bore of the hub 10 and coupling the shaft and the hub together for simultaneous rotation so that the shaft is driven by the clutch.

The driving part A of the clutch includes a support member 13, which extends transversely around the hub 10 and carries friction pads 18. The support member 13 is arranged to be gripped, through its friction pads 18, between a pressure plate and a reaction plate, not shown, which rotate with the driving shaft of the clutch. Neither the driven shaft nor the driving shaft is shown in the drawings.

The resilient means referred to above comprise resiliently deformable arms 29, each of which extends between two carrier elements, namely an inner carrier ring 34 and an outer carrier ring 35. The arm 29 is integrally connected with one of these carrier elements, in this example the outer carrier ring 35, through an outer junction or base zone 36. The carrier ring 35 with which the arm 29 is so connected is coupled with the support member 13 for rotation with the latter. The other carrier element, i.e. the inner ring 34, is provided with driving means adapted to couple the ring 34 with the other coaxial part (i.e. the part B) of the clutch assembly, so as to rotate with the part B during at least part of the angular displacement between the two parts A and B.

Each of the arms 29, with its carrier rings 34 and 35, together constitute a respective one of two flat, resilient circular members (here referred to as resilient, or spring, plates), 40 and 41, extending transversely with respect to the axis of the assembly. The resilient plates 40 and 41 are coaxial with each other and lie side by side. They operate in parallel.

In accordance with the invention, the torsion damper does in fact include at least two pairs, C and D, of similar flat resilient plates, with the pair of plates C lying between the flat resilient plates of the other pair D and being offset angularly with respect to the pair of plates D, in such a way that the two pairs C and D balance each other radially. The arms 29 of the resilient plates constituting either one of the pairs C or D are aligned with each other.

Figure 1:
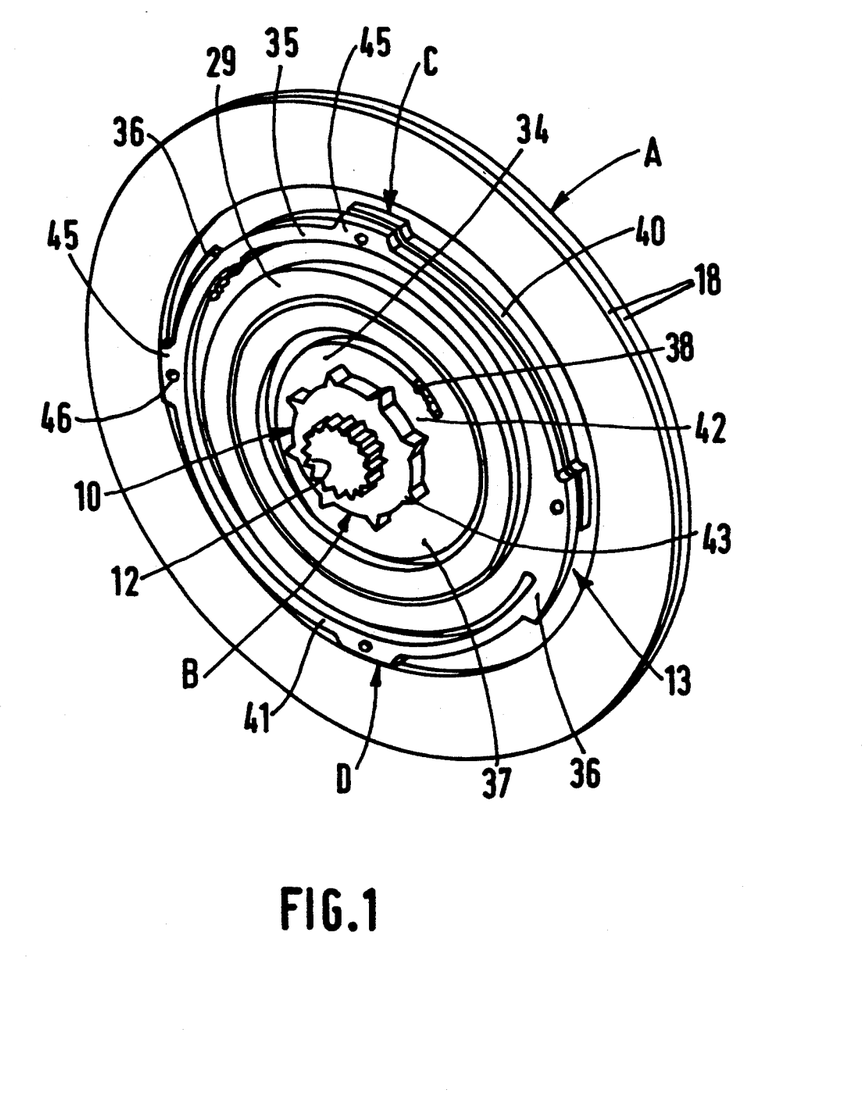
FIG. 1 is a simplified perspective view showing a torsion damper in a first embodiment of the invention.

In FIG. 1, the resilient, or spring, plate 40 is one of those forming part of the first pair C, and the spring plate 41 is one of those forming part of the other pair D. The support member 13 is interposed centrally between the spring plates 40 of the first pair C. As can be seen, each spring plate includes a single spring arm 29, arranged as described above and extending in the form of a spiral over more than 360°. In this example the angular offset between the two pairs of spring plates is 180°.

In order to show the form of the spring plates clearly in FIG. 1, internal friction means which are provided in the torsion damper are not shown in that Figure. These friction means are shown however in FIG. 2, and will be described below.

The inner carrier ring 34 of each spring plate 40 or 41 has a set of teeth, generally trapezoidal in shape and cooperating with another set of complementary trapezoidal teeth 43, which is common to all four of the spring plates 40, 41 and which is formed on the hub 10 so as to couple the spring plates 40 and 41 with the hub after a clearance between the hub and the respective carrier ring 34 has been taken up.

Each spring arm 29 joins the corresponding inner support ring 34 in an inner junction or base zone 37 which is made to be suitably robust. Accordingly, the arm 29 skirts the carrier ring 34 circumferentially, and is separated from it by a gap 38, the blind end of which is opened out in an eccentric circular profile.

Figures 2, 3:
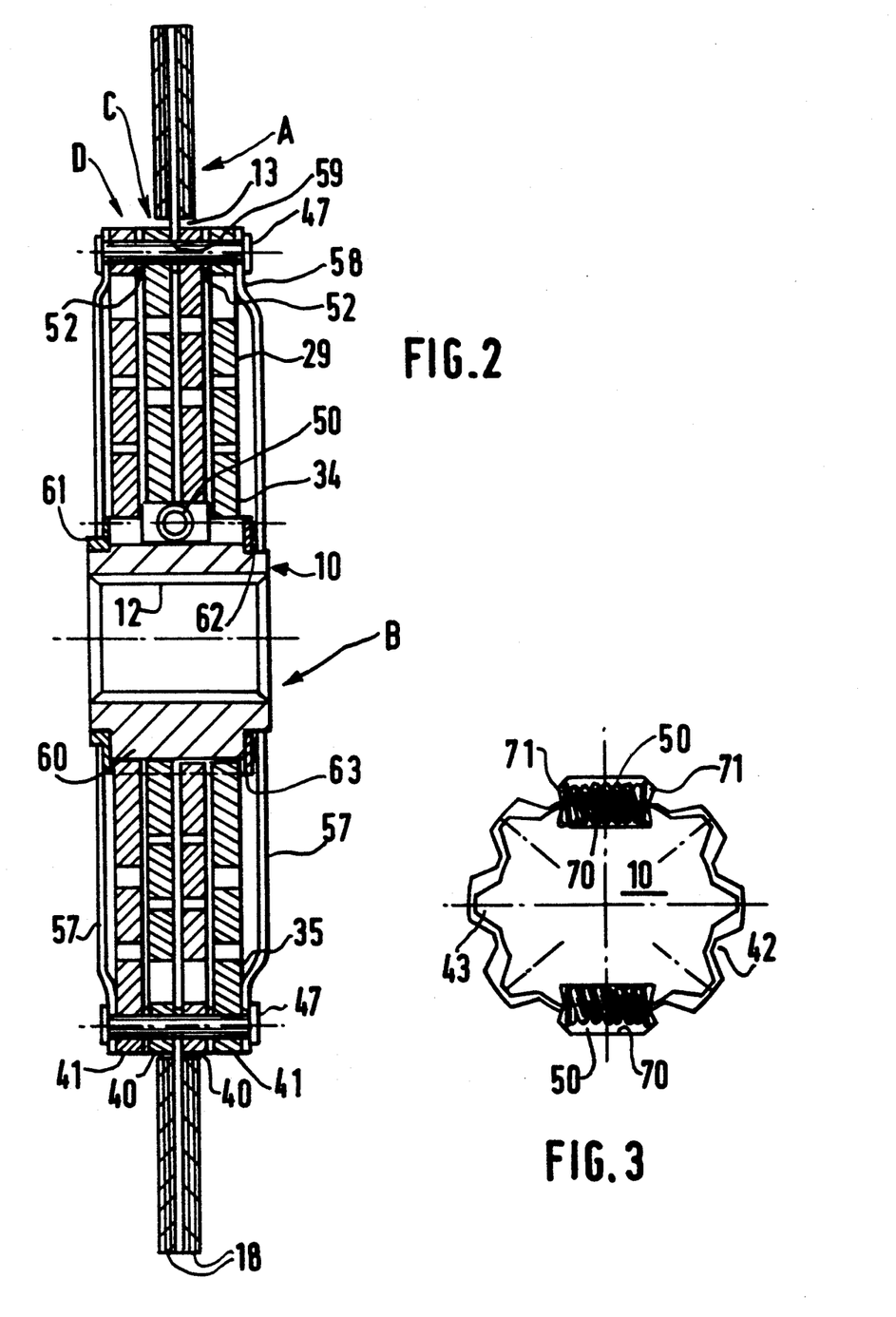
FIG. 2 is a view in axial cross section of the same embodiment.
FIG. 3 is a diagrammatic partial end-on view, to illustrate the action of a low stiffness resilient means of the damper.

The outer carrier ring 35 of each spring plate 40 or 41 has a number of equally spaced lugs 45, extending radially outwards and formed with holes 46, through which pass elongate fasteners 47, comprising rivets in this example as shown in FIG. 2.

The outer junction zone 36, joining the spring arm 29 and the outer carrier ring 35, is extended radially to form a radial tongue, of the same radius as the lugs 45, but circumferentially longer than the latter to give it additional strength. Like each of the lugs 45, the tongue of the junction zone 36 has a hole 46, and for the same purpose. It thus completes the mounting means of the spring plate by constituting, in this example, one of four radially projecting elements which are spaced at regular intervals around the carrier ring 35. Due to the alignment between arms 29 mentioned above, the junction zones 36 of the spring plates 40 or 41 of one pair C or D lie juxtaposed with each other, while those of one pair of spring plates are separated from those of the other by an angle of 180°.

The spring arms 29 of the spring plates 40 are identical with those of the spring plates 41 and have a constant thickness. They are formed from a thin metal blank by a pressing operation, being subsequently heat treated and, if necessary, shot blasted.

The spring plates 40 and 41 are mounted on the hub 10 with their teeth 42 located between the teeth 43 of the hub 10 with a circumferential clearance as can be seen in FIG. 3. They are generally similar to each other, apart only from the fact that their inner carrier rings 34 are different from each other. More precisely, and referring to FIG. 3, slots 70 are formed so as to interrupt the sets of teeth 42 and 43 of the spring plates 40 and the hub 10 respectively. Resilient means, which in this example consist of coil springs, bear against the lateral ends of the slots 70 through inserts 71, each of which has a profiled outer surface conforming with the combined profile of the slots 71 in which it engages, in the manner described in French Patent Publication FR 2 270 491 A. The springs 50 are significantly weaker than the spring arms 29 in terms of stiffness.

In the interests of standardisation it will be realised that slots 70 may also be formed in the spring plates 41. As can be seen in FIG. 2, the fasteners 47 are passed through holes formed in spacer rings 52, each of which is in the form of a crown, interposed axially between one of the spring plates 40 and the adjacent spring plate 41. Two cover plates 57 are mounted outside the pairs C, D of spring plates 40 and 41, and have holes through which the rivets 47 pass, the expanded heads of the rivets being in contact with the outer faces of the cover plates 57 to secure the latter together with the four spring plates and the spacer rings 52. Each cover plate 57 has an outer portion 58, which is axially offset from the main body of the cover plate and which lies against the outer carrier ring 35 of the adjacent spring plate 41. The support member 13 constitutes a spacer ring between the spring plates 40, and has holes 59 through which the rivets 47 pass. It will be realised that the central location of the support member 13 favours a symmetrical distribution of the forces exerted in operation, so that the friction pads 18 are maintained perpendicular. In a similar way, centring of the outer pair of spring plates 41 is ensured indirectly by the weak springs 50, given the arrangement described above.

The hub 10 has a radially projecting portion in which the set of teeth 43 is formed. The internal friction device mentioned above comprises a plain bearing ring 61 of L-shaped cross section, which is inserted between the hub 10, the radially projecting portion 60 of the latter, and one of the cover plates 57, while an axially acting resilient element (a Belleville washer) 62 bears on the other cover plate 57 so as to bias a spacing ring 63 axially into end contact with the hub portion 60. The spacer ring 63 has a plurality of axialy extending lugs (not shown), each of which cooperates with one of a set of openings formed in the cover plate 57 so that the spacer ring rotates with the latter.

The clutch operates in the following manner. In a first phase of its operation, the spring plates 40 and 41 are displaced rotationally with respect to the hub 10 against the action of both the springs 50 and the friction means 61–63, until the circumferential clearance between the teeth 42 and 43 has been taken up. In the second phase, the arms 29 of the spring plates 40 and 41 are deformed as spiral springs, and the support member 13 is thereby displaced rotationally with respect to the hub 10 against the action of the spring arms 29, which work in parallel with each other. The inner carrier rings 34 are then coupled with the hub 10 so as to be rotatable with it, over at least part of the angular displacement between the hub 10 and the support member 13.

It will be appreciated that it is possible to obtain a large relative angular displacement between the hub 10 and the support member 13 by the use of the invention, and this allows resiliently deformable arms, such as 29, of considerable length to be used, with these arms still remaining capable of withstanding the same stresses as in prior art arrangements. With this large displacement, the use of the single spring arm avoids the use of the more conventional coil springs with contiguous turns, which results in an improvement in the life expectancy of the spring means.

The radial forces acting within the torsion damper are negligible, as are tilting moments, due to the 180° offset between the spring plates 40 and the spring plates 41. It will also be appreciated that the hub 10 is able to slide easily on the gearbox shaft. All of this tends to encourage the release of the friction pads 18 from the pressure plate and reaction plate during the declutching operation. In addition, the bearing 61 is not exposed to a risk of being damaged by the adjacent cover plate 57, because of the good balance obtained in the assembly.

In a modification, the springs 50 and their associated slots 70 may be omitted, the spring plates 40 and 41 being then identical with each other and meshing together through their sets of teeth 42, without a circumferential clearance between them, and the teeth 43 of the hub 10.

If necessary, the holes 59 formed in the support member 13 may be oblong in shape for coupling the support member 13 to the hub 10, with some clearance, through the spring arms 29.

As will be evident from the above description, the sets of teeth 42 and 43 facilitate assembly of the friction clutch, the hub 10 having a very simple form. The hub may be made of sintered material, permitting easy sliding of the hub on the gearbox shaft while also ensuring that the radially projecting portion 60 of the hub has a satisfactory degree of hardness. It will also be understood that the outer junction zone 36 allows the spring plates 40 and 41 to be oriented satisfactorily.

The resilient means may of course be made of a composite material, consisting of an organic matrix reinforced with suitable filaments, the filaments forming a continuous fibre armature oriented in the direction of rotation of the resiliently deformable arms 29 in the manner described in the French Patent Publication No. FR 2 611 013 A.

It is also possible to provide three or more pairs of spring plates. Where there are three pairs, the third pair encloses the second pair between its two plates, with the second pair then enclosing the first pair between its own two plates. The angular offset between each of the three pairs of plates and each of the others is then 120°. In the case of four pairs of spring plates, the same pairing arrangement is adopted (i.e. each pair lying between the plates of the next following pairs), but here the angle of offset between each pair and the next is 180°.

It will be noted that where there are four pairs of spring plates, those of the two outermost pairs may differ from those of the central pairs, especially as regards plate thickness. It is thus possible to provide sets of teeth on the outermost pairs which mesh with the teeth of the hub with a different clearance from that which is provided between the hub teeth and the teeth of the central pairs of plates. This enables one pair of spring plates to come into operation before another, and the number of different rates at which the friction clutch operates in successive steps can thus be increased. The four pairs of spring plates may be offset by 90° with respect to each other, but in this case the spring plates are preferably all the same as each other, with identical arms 29.

Figure 4:
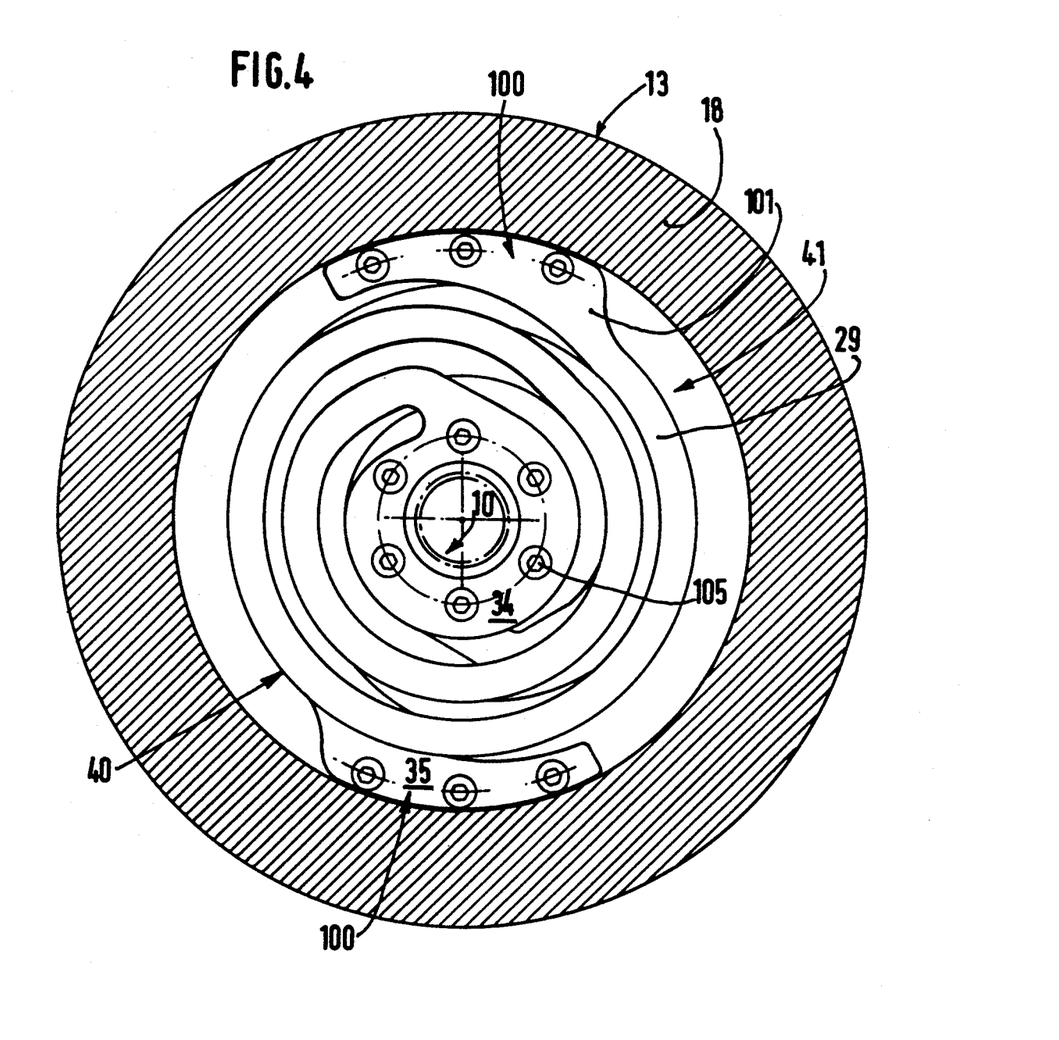
FIG. 4 is an end-on view showing a torsion damper in another embodiment of the invention, seen in the direction of the arrow IV in FIG. 5.
Figures 5, 6:
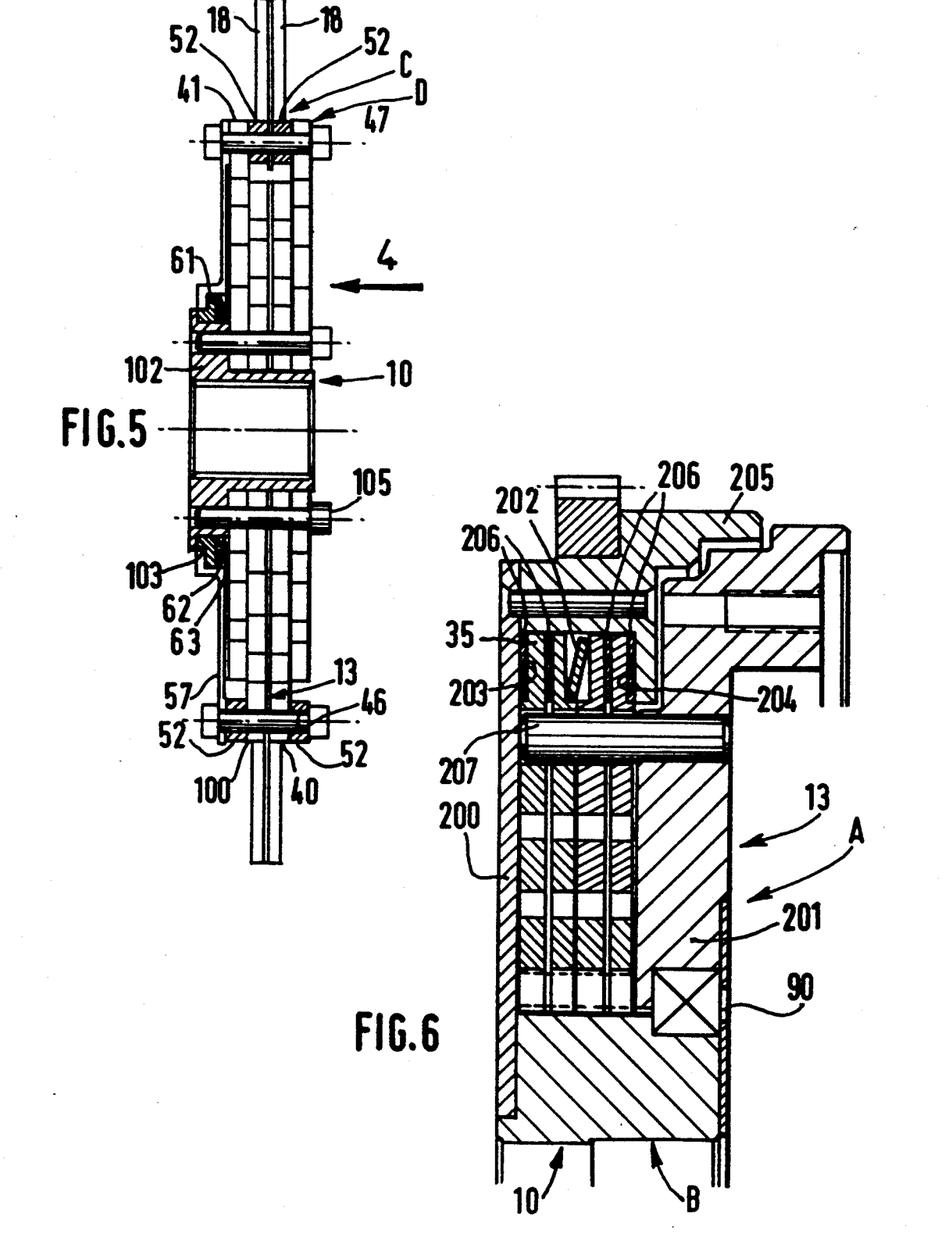
FIG. 5 is a view in axial cross section showing this second embodiment.
FIG. 6 is a view in axial cross section showing a flywheel incorporating a torsion damper in a further embodiment of the invention.

The outer carrier element 35 may consist of a simple, radially extending, tongue 100 as shown in FIGS. 4 and 5, instead of a ring as in FIG. 1. The tongue 100 has at least one hole 46 through which the fasteners 47 are engaged. In the particular arrangement shown in FIGS. 4 and 5, the tongue 100 extends circumferentially over a greater distance than the tongue of the outer junction zone 36 in FIG. 1, and is formed with three holes 46. The tongue 100 is formed in an extension of the inner periphery of the spring arm 29, while it is joined to the outer periphery of the latter through a radiussed neck portion 101, so that the radial width of the tongue 100 is larger than that of the arm 29. The tongue 100 thus strengthens the junction zone, i.e. neck portion 101, by reducing the stresses to which the latter is subjected. The radius of the neck portion 101 is larger than that of the outer junction portion 36 in FIG. 1. The tongue 100 has an annular peripheral profile and becomes narrower towards its free end.

At one of its axial ends, the hub 10 has a radial flange 102, the outer periphery of which is formed with a shoulder 103 against which the free end of the bearing 61 abuts. The cover plate 57 on that side of the clutch cooperates with the bearing 61, having (as seen in FIG. 5) an inverted L-section profile on its inner periphery. The resilient means 62 and the spacer ring 63 are interposed between the bearing 61 and one of the spring plates 41. In this case, it is not necessary to provide the other cover plate.

Each of the tongues 100 partially covers a spring arm 29 of an adjacent spring plate, with the aligned tongue 100 of the pair C of spring plates being diametrically opposed to those of the pair D, due to the 180° offset mentioned above. In the arrangement as shown in FIG. 5, the spacer rings 52 are interrupted so as to adapt them for the presence of the tongues 100. The inner carrier rings 34 and the hub 10 are coupled together for simultaneous rotation in the arrangement shown in FIGS. 4 and 5 by means of a plurality of screws 105, passing through corresponding holes in the carrier rings 34 and screwed into the flange 102, while the fasteners 47 are in the form of bolts. The inner junction zone 37 includes a radial portion 110 which is radially enlarged to reduce local stresses. All of this allows the length of the arm 29 to be increased. In a further modification, the fixing tabs of the spring plates, as described in the European Patent document EP O 200 634 A, may each be engaged in an opening formed in a crown member extending generally axially and fixed to a ring which carries the support member, with the resiliently deformable plates being maintained, if need be, at a distance from each other by spacer means comprising shoulders formed in the said openings in the crown, or alternatively comprising annuli. In this arrangement, a cover plate or closure ring is fixed by fitting or welding it on to the free end of the crown. Such an arrangement may also be applied to the torsion damper shown in FIG. 1.

The spring plates may include carrier rings which are not entirely identical, while remaining similar as far as the resiliently deformable arms are concerned. The spacing fasteners 47 may be flat in shape. The support member 13 may be fixed directly to a reaction plate coupled with the engine crankshaft, with the hub 10 then being coupled with a shaft and a clutch.

The driving and driven parts of the assembly may if desired be transposed. An example of such an arrangement is shown in FIG. 6, in which the support member 13 is coupled with one of the inertia masses of a double damped flywheel and serves as the reaction plate, while a ball bearing 90 is interposed radially between the hub 10, permanently coupled with the engine shaft, and the reaction plate 13. The hub 10 is secured to a transverse face plate 200.

In order to create a coupling using cooperating matched profiles, the reaction plate 13 has on its inner periphery an axial flange 201, in which teeth are formed for cooperation, without clearance, with complementary teeth formed on the inner carrier rings 34. An axially acting resilient element 202, such as a Belleville washer, is interposed axially between the carrier rings 35 of the pair C of spring plates, so as to urge the spring plates 40 and 41 respectively towards a radial surface 203 (formed on the face plate 200), and a radial surface 204 which is formed on a radial flange of an outer flywheel 205, which carries the starter ring and which is secured to the face plate 200, by riveting in this example. In this case, the outer carrier rings 35 are of reduced thickness. Friction rings 206 are interposed between the spring plates 40 and 41, and between the plates 41 and the surfaces 203 and 204. The stiffness of the resilient rings 202 is calculated as a function of the maximum torque which is transmissible by the engine, so that the torque due to the friction rings 206 shall be approximately equal to this maximum engine torque, but preferably greater than the latter.

To control the spring arms 29 and prevent the turns of the spirals touching each other, diametrically opposed pins 207 may be arranged to extend through the gaps provided between the arms 29, the pins 207 being carried by the reaction plate 13 and supporting the friction pads (not shown) of the clutch. The pins 207 are arranged to cooperate with shoulders formed on the spring arms 29. The structure of the reaction plate can of course be reversed, so that it has teeth on its outer periphery for engagement with complementary teeth formed on the outer carrier rings 35, while the radial friction surfaces are then formed respectively on the inner periphery of the face plate 200 and on a radial flange of the hub 10. The pins 207 may, in yet another arrangement, be carried by the face plate 200, in which connection reference is invited to the specification of French Patent Application No. 89 03545.

Finally, the spring plates may be provided with several resiliently deformable arms in the manner described in U.S. Pat. No. 2,141,014.

What is claimed is:

1. A device with torsional damping of the kind comprising at least two coaxial parts, the device comprising a support member and a hub forming part of a first of said coaxial parts and of a second of said coaxial parts respectively, mounting means mounting the support member and said hub for relative rotation of one with respect to the other and a plurality of resilient means for resiliently opposing the relative rotation of the hub and the support member, second mounting means mounting said resilient means in parallel with each other whereby said resilient means couple the support member and the hub together, each of said resilient means being formed as a resilient plate which comprises at least one resiliently deformable arm together with inner and outer carrier rings, said arm extending between said carrier rings and being connected integrally with at least said outer carrier ring through a junction or base zone, the device further comprising first coupling means coupling said outer carrier ring with said support member of said first coaxial part of the device for rotation therewith, said resilient plates being arranged in two pairs, a first of said pairs lies axially between the resilient plates of a second of said pairs, the plates of each pair being offset circumferentially by 180 degrees with respect to those of the other pair, the resilient arms of the plates constituting each said pair being aligned with each other, said first coupling means coupling said outer carrier ring to said support member comprises at least one radially outwardly projecting element for attachment of the outer carrier ring with said support member for rotation therewith, each said radially outwardly projecting element having at least one through hole, the device further including a plurality of fastener members extending through said holes and axially joining the pairs of resilient plates together, said junction zone joining the resilient arm to the outer carrier ring also comprises a radially outwardly extending projection element which is larger than each said radially outwardly projecting element.

2. The device as recited in claim 1, wherein the at least one radially outwardly projecting element is formed integrally with and projects radially outwardly from the outer carrier ring.

3. The device as recited in claim 1, wherein the radially outwardly extending projection element is circumferentially longer than the at least one radially outwardly projecting element to provide additional strength.

4. The device as recited in claim 1, wherein three of said radially outwardly projecting elements are provided on each said outer carrier ring, and wherein the three radially outwardly projecting elements and the radially outwardly extending projection element are spaced from each other at regular intervals around the carrier ring.

5. A torsion damping device, comprising
a hub member;
a support member;
mounting means for mounting the hub and the support member for relative rotation of one with respect to the other;
a plurality of resilient members connected between the hub member and the support member for opposing the relative rotation of the hub member and the support member;
wherein each of the resilient members is made from a resilient plate and comprises an inner carrier ring, an outer carrier ring, and a resiliently deformable arm extending between and connecting the inner carrier ring and the outer carrier ring;
wherein first coupling means are provided for coupling the hub member to the inner carrier rings of the plurality of resilient members, and second coupling means are provided for coupling the support member to the outer carrier rings of the plurality of resilient members;
wherein the outer carrier rings are each provided with a plurality of radially outwardly extending lugs extending radially outwardly therefrom, and wherein the second coupling means comprises a plurality of fasteners which extend through holes provided in the support member and through holes provided in the radially outwardly extending lugs of the outer carrier rings, whereby the support member is coupled for rotation with the outer carrier rings via the fasteners,
wherein, for each of the resilient members, the resiliently deformable arm is joined to the outer carrier ring at a junction zone, and the junction zone is extended radially outwardly to form a radial tongue, and wherein means are provided for connecting the radial tongues of the plurality of resilient members to the support member,
wherein, for each of the resilient members, the radial tongue is circumferentially longer than each of the radially outwardly extending lugs.

6. A torsion damping device, comprising
a hub member;
a support member;
mounting means for mounting the hub and the support member for relative rotation of one with respect to the other;
a plurality of resilient members connected between the hub member and the support member for opposing the relative rotation of the hub member and the support member;
wherein each of the resilient members is made from a resilient plate and comprises an inner carrier ring, an outer carrier ring, and a resiliently deformable arm extending between and connecting the inner carrier ring and the outer carrier ring;
wherein first coupling means are provided for coupling the hub member to the inner carrier rings of the plurality of resilient members, and second coupling means are provided for coupling the support member to the outer carrier rings of the plurality of resilient members;
wherein the outer carrier rings are each provided with a plurality of radially outwardly extending lugs extending radially outwardly therefrom, and wherein the second coupling means comprises a plurality of fasteners which extend through holes provided in the support member and through holes provided in the radially outwardly extending lugs of the outer carrier rings, whereby the support member is coupled for rotation with the outer carrier rings via the fasteners,
wherein each of the plurality of resilient members is provided, at an inner periphery thereof, with radially inwardly directed teeth which engage, with circumferential clearance, radially outwardly directed teeth provided on the hub member, and circumferential biasing means are interposed between the hub member and the plurality of resilient members, wherein the circumferential biasing means are significantly weaker than the resiliently deformable arms of the plurality of resilient elements.

7. A torsion damping device, comprising
a hub member;
a support member;
mounting means for mounting the hub and the support member for relative rotation of one with respect to the other;
a plurality of resilient members connected between the hub member and the support member for opposing the relative rotation of the hub member and the support member;
wherein each of the resilient members is made from a resilient plate and comprises an inner carrier ring, an outer carrier ring, and a resiliently deformable arm extending between and connecting the inner carrier ring and the outer carrier ring;
wherein first coupling means are provided for coupling the hub member to the inner carrier rings of the plurality of resilient members, and second coupling means are provided for coupling the support member to the outer carrier rings of the plurality of resilient members;
wherein the outer carrier rings are each provided with a plurality of radially outwardly extending lugs extending radially outwardly therefrom, and wherein the second coupling means comprises a plurality of fasteners which extend through holes provided in the support member and through holes provided in the radially outwardly extending lugs of the outer carrier rings, whereby the support member is coupled for rotation with the outer carrier rings via the fasteners,
wherein two pairs of the resilient members are provided such that a first pair of the two pairs of resilient members lies axially between the resilient members of the second pair, wherein the support member is interposed centrally between the resilient members of the first pair, wherein the resilient members of each pair are circumferentially offset by 180 degrees with respect to those of the other pair, wherein the resilient deformable arms of the resilient members constituting each said pair are aligned with each other, and wherein the fasteners each pass through the holes provided in the radially outwardly extending lugs of the first and second pairs of resilient members and the support member.

8. The device as recited in claim 7, wherein a pair of spacer rings are provided in the device, each of the spacer rings being sandwiched between a resilient member of the first pair and a respective one of the resilient members of the second pair which lies adjacent to the resilient member of the first pair, and wherein the fasteners further each pass through holes provided in the pair of spacer rings.

* * * * *